Jan. 6, 1942.  A. T. LUER ET AL  2,268,712
MEANS FOR TAKING PICTURES IN THE THIRD DIMENSION
Filed Aug. 22, 1939  5 Sheets-Sheet 1

Inventors:
ALBERT T. LUER,
DONALD M. PERRY,
WARREN HOWELL,
AND WALDO E. HOWELL
By James M. Abbott
Attorney

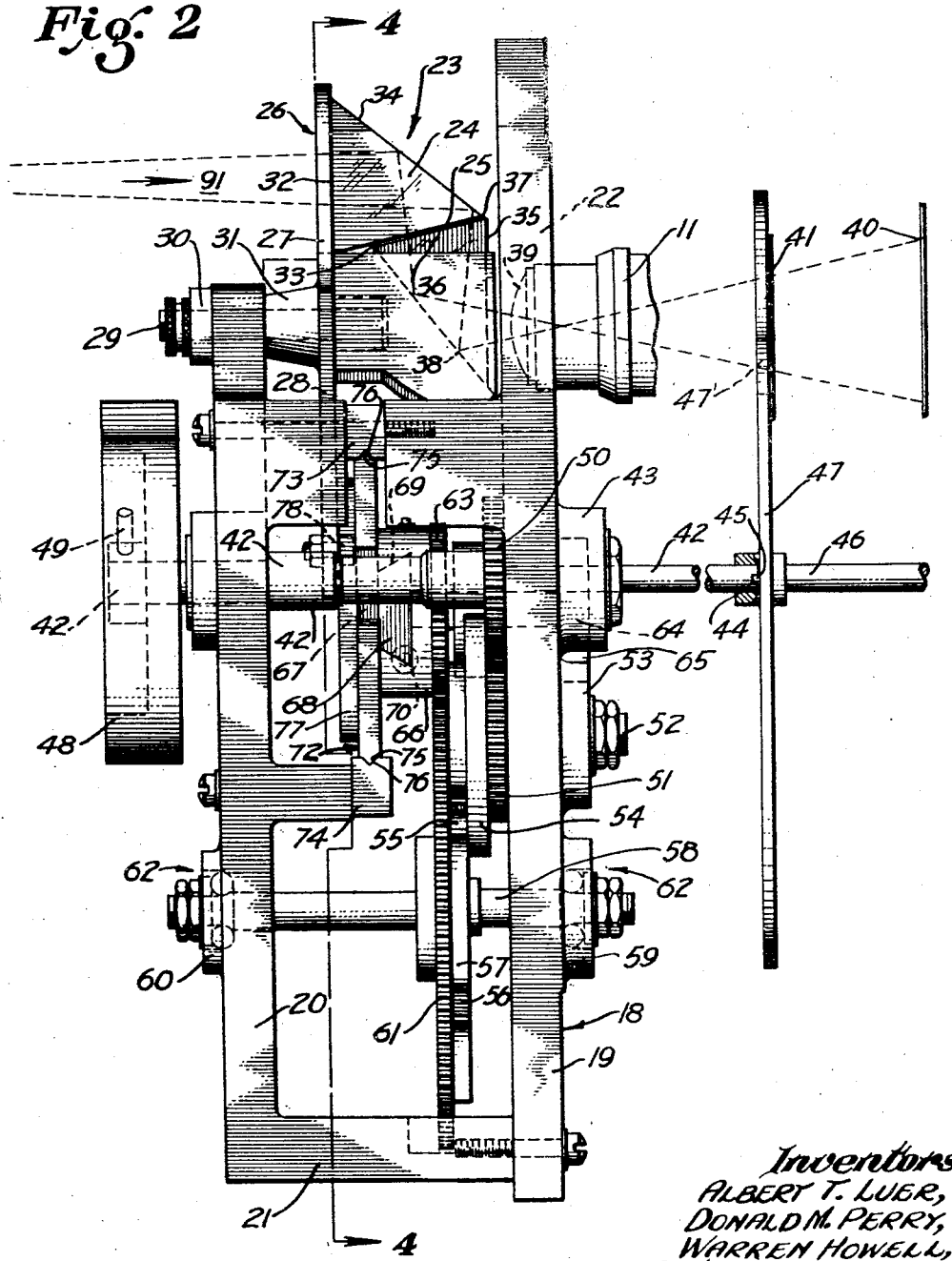

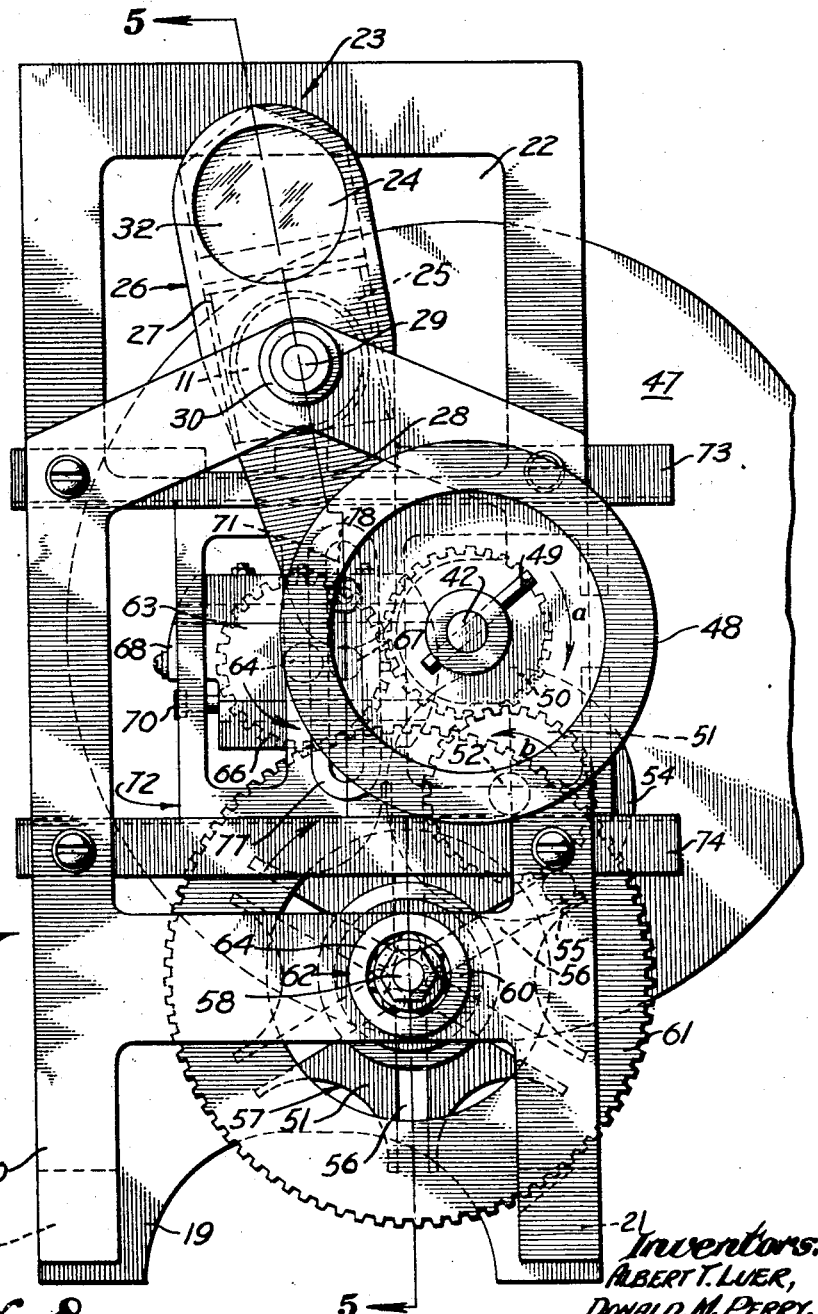
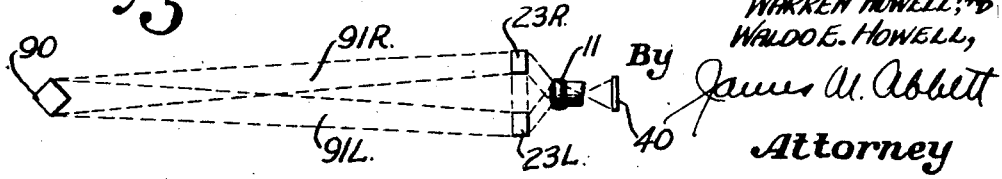

Jan. 6, 1942.  A. T. LUER ET AL  2,268,712
MEANS FOR TAKING PICTURES IN THE THIRD DIMENSION
Filed Aug. 22, 1939  5 Sheets-Sheet 4

Inventors:
ALBERT T. LUER,
DONALD M. PERRY,
WARREN HOWELL, AND
WALDO E. HOWELL,
By James M. Ablett
Attorney

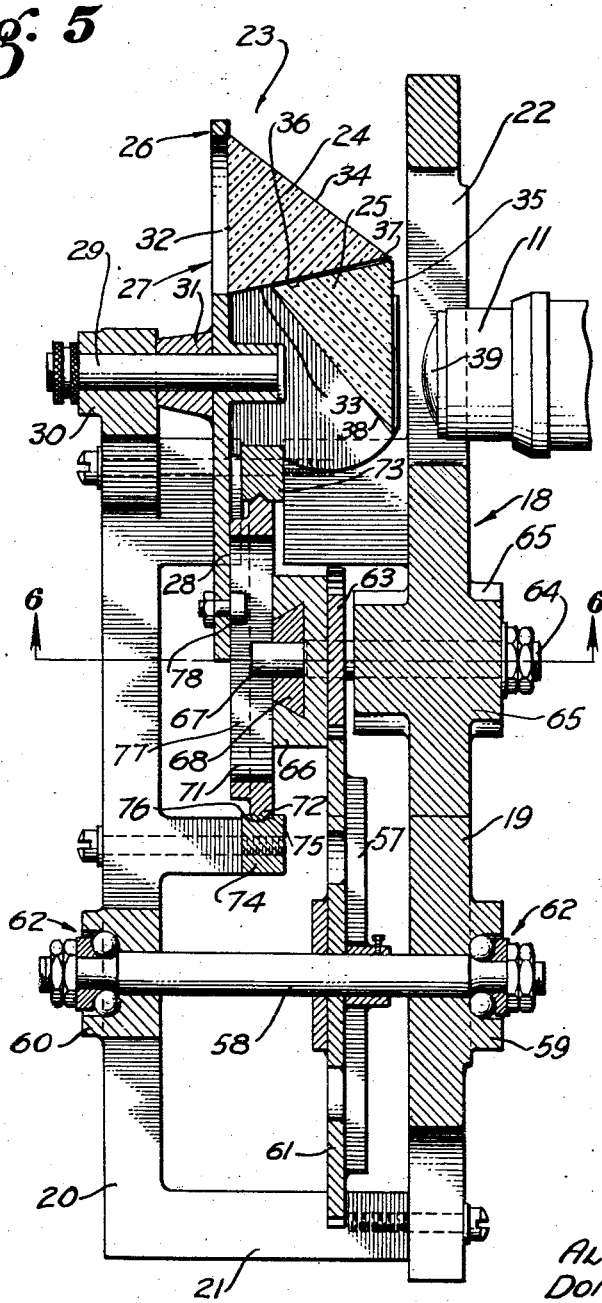

Patented Jan. 6, 1942

2,268,712

UNITED STATES PATENT OFFICE 2,268,712

MEANS FOR TAKING PICTURES IN THE THIRD DIMENSION

Albert T. Luer, South Pasadena, Donald M. Perry and Warren Howell, Pasadena, and Waldo E. Howell, Altadena, Calif.; said Perry, said Warren Howell, and said Waldo E. Howell assignors to said Luer Application August 22, 1939, Serial No. 291,394

6 Claims. (Cl. 88—16.6)

This invention relates to photographic apparatus and pertains particularly to means for taking pictures in the third dimension.

Heretofore, various types of photographic apparatus have been provided for taking pictures which in their final form will give the illusion of depth, and will thus approximate the appearance of a photographic subject in three dimensions. These various cameras have for the most part been based on the theory that the effect of third dimension as obtained by the eyes is caused due to the fact that the eyes are spaced apart and view an object from opposite side angles. The composite view made from the two aspects gives the effect of depth to the scene being viewed. Photographically this effect has been obtained in stereoscopic pictures where the separate views are observed simultaneously and individually, each eye seeing but one view. An attempt has been made to obtain this same result in motion pictures, although in this case the right and left pictures cannot be viewed simultaneously but are viewed consecutively by both eyes, and the phenomena of persistence of vision is relied upon to produce the illusion of third dimension. In taking and preparing the film for creating that illusion special types of cameras have been used, for the most part having separate object lens sets, one being a right-hand lens set and the other being a left-hand lens set, and which lens sets are spaced apart sufficiently to give the effect of depth in the picture when it is subsequently projected on a screen.

The apparatus required for producing a photographic negative having consecutive views alternately in focus with the right and left hand lens sets, has for the most part embodied the use of reflectors and shutters which required rapid motion to control the direction of the light beams and which often produced sufficient vibration to cause an imperfect image to be photographed with a resulting unsatisfactory picture.

It is the principal object of the present invention to provide a camera for taking stereoscopic motion pictures which is provided with an operating and reflecting means simple in construction, compact in arrangement and rugged in design, whereby the light beam carrying the image of an object being photographed may be directed into the camera and on to consecutive frames of a film without vibration and in a manner to produce pictures having clear definition and which when projected upon a screen do produce the illusion of third dimension.

The present invention contemplates the provision of a motion picture camera having the usual feed and shutter mechanisms and a lens set, and which camera is equipped with vibrating light directing means acting in synchronism with the shutter mechanism and directing alternate beams of light from a right and a left-hand lens set through an aperture on to successive frames of a motion picture film.

The invention is illustrated by way of example in the accompanying drawings, in which:

Fig. 2 is an enlarged fragmentary view in side elevation showing the light directing unit of the camera.

Fig. 3 is a view in front elevation showing the light directing unit with the case of the structure removed, the view being taken on the line 3—3 of Fig. 1.

Fig. 5 is a view in central vertical section through the light directing means as seen on the line 5—5 of Fig. 3.

Fig. 8 is a diagrammatic view showing the method of taking right and left-hand views of an object in pictures.

Fig. 9 is a view showing a fragmentary portion of film taken in the camera with which the invention is concerned.

Figure 1:
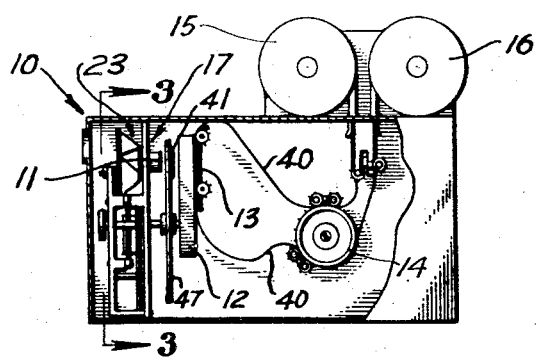
Fig. 1 is a view in section and side elevation indicating a motion picture camera of the type of which the present invention is concerned.

Referring more particularly to Fig. 1 of the drawings, 10 indicates a motion picture camera, which includes an object lens set 11, the usual shutter and film gate unit 12 having suitable film feed means 13, a driving sprocket 14 and film magazines 15 and 16. It is to be understood that these various units are of standard commercial design and that their details of construction are not pertinent to the present invention. The present invention is more particularly concerned with a light directing unit 17 which is interposed between the object lens and the image to be photographed.

Attention is directed to the fact that in the present instance only one lens set is used and that beams of light carrying right and left-hand aspects of an image are alternately directed to this one lens set. The means for directing the light to the lens set is the particular subject matter of the present invention and is shown in detail in the accompanying drawings.

Referring particularly to the drawings, it will be seen that a frame structure 18 is provided which supports the light directing means and the driving mechanism therefor. This frame 18 includes a back plate 19 and a front frame element 20 spaced therefrom and associated therewith by a horizontal tie member 21.

The back plate is formed adjacent to its upper end with a light beam opening 22. Disposed in advance of this light beam opening is a light directing optical unit 23. This includes two optical prisms 24 and 25 which will be described with more detail hereinafter. The unit is mounted upon an oscillating element 26 which has an upper portion 27 to which the unit is connected, and a lower lever portion 28 by which the unit is oscillated. The member 26 is rotated at a point intermediate to its ends upon a horizontal shaft 29 carried in a bearing 30 which occurs at the upper end of the vertical frame element 20. A spacing bushing 31 is disposed between the element 20 and the oscillating member 26.

The axis of the horizontal shaft 29 is in alignment with the central axis of the lens set 11. Thus, the optical unit 23 will oscillate around this axis as it scans the scene being photographed. The optical unit 23 is particularly disclosed in Figs. 5 and 7. Here it will be seen that the prism 24 in vertical section is triangular, having a front face which may here be termed the altitude face 32 which is vertically disposed and as indicated in Fig. 3 of the drawings is circular in contour. The base face 33 is in a single plane extending rearwardly from the front face and disposed at a slight inclination to the horizontal. A hypotenuse plane face 34 extends from the upper edge of the altitude face to the rear edge of the base face and provides a reflecting surface against which the light rays are reflected. The prism 24 will hereinafter be designated the scanning prism and the prism 25 will be designated the reflecting prism. The reflecting prism 25 is triangular in shape and has a light emitting face 35, which is parallel to the light entering face 32 of the scanning prism 24. The base face 36 of the reflecting prism 25 is parallel to the base face 33 of the scanning prism 24 and is spaced therefrom to provide an air gap 37 which acts to prevent direct transmission of light through the scanning prism 24 to the reflecting prism 25. The reflecting face 38 of the prism 25 is presented forwardly and received the light beams bent downwardly by the reflecting face 34 of the scanning prism, after which the beams pass through the lens set 39 to the photographic film 40 and through the lens stop 41. Thus, as the prism set oscillates on the optical axis of the lens set 39 different aspects of the scene being photographed will be alternately directed from the scanning prism 24 to the reflecting prism 25 and then to the film. The distance between the two focal positions of the optical unit 23 will produce a condition agreeing with that obtained by the spaced position of the eyes in viewing the scene. In the present instance, as will be hereinafter set forth, this spacing may be arranged to accentuate the effect of third dimension, which it is desirable to obtain, and also for the purpose of compensating for conditions produced by photographing a subject near the camera or at a distance from the camera.

The oscillating operation is produced by the mechanism carried by the frame 18 and comprises a drive shaft 42 which is rotatably supported in a bearing 43 on the upright 19 of the frame and which extends through bearing opening of the upright 20. This shaft carries a transverse slot 44 in its end face to receive a transverse key 45 carried upon the end of the shaft 46 of the shutter 47. The shutter 47 is of usual camera construction and intermittently interrupts the beam of light passing from the lens set 11 to the film 40. The shaft 46 is operatively connected to the drive mechanism of the camera, generally indicated at 10 in the drawings, and is in synchronism with the film feed mechanism so that there will be a definite relationship between the oscillating movement of the scanning prism 24 and the shutter and camera mechanism. The shaft 42 spans the space between the frame uprights 19 and 20 and is provided at its outer end with a fly wheel 48 by which the mechanism is balanced. A balancing key 49 may be provided to extend through the end hub of the fly wheel and the shaft 42.

Mounted on an enlarged portion of the shaft 42 occurring between the frame uprights 19 and 20 is a spur gear 50 which is keyed to the shaft and is in mesh with a gear 51 keyed to a stub shaft 52. The shaft 52 is rotatably supported in a bearing 53 formed as a part of the frame upright 19. This shaft carries a disc 54 from the end face of which a pin 55 of an intermittent moving mechanism projects. The disc and pin are a part of a Geneva motion. The pin moves into radial grooves 56 of a star wheel 57. The star wheel 57 is rotatably supported upon a shaft 58. The shaft 58 is carried in bearings 59 and 60 on the rear and front frame elements 19 and 20 of the frame structure 18. Associated with the star wheel 57 is a gear 61 which is secured to move in unison therewith. The star wheel and the gear are provided with anti-friction bearings 62 by which they are directly supported upon the shaft 58. The gear 61 is of relatively large diameter and is in mesh with the drive pinion 63 carried upon a crank shaft 64. This shaft is a spur shaft secured in a bearing 65 on the rear frame element 19 of the frame 18.

Rotatably secured upon the shaft 64 is a disc 66 which is secured to rotate with the gear 63. The disc 66 is a part of a Scotch yoke mechanism and carries a yoke pin 67. This pin is mounted upon a transverse plate 68 which slides within a dove-tailed transverse groove 69 extending across the diametrical end face of the disc 66. An adjusting screw 70 is carried by the disc 66 and cooperates with the transverse plate 68 to shift the plate 68 transversely of the disc 66, and at the same time shifts the pin 67 so that the stroke of the pin may be changed. The pin 67 projects into an elongated slot 71 of a sliding yoke 72. The elongated slot 71 is here shown as extending vertically and at right angles to the path of travel of the yoke 72. The yoke is horizontally reciprocable between guideways 73 and 74 and as shown in Fig. 5 of the drawings the horizontal edges of the yoke 72 are formed with V-shaped ribs 75 which fit into V-shaped grooves 76 of the guideways 73 and 74. Then it will be recognized that as the disc 66 and the gear 63 rotate upon the shaft 64 the pin 67 will pursue a circular path of travel while maintaining its position projected into the slot 71 and while thus causing the yoke 72 to reciprocate on the guideways 73 and 74, thereby translating the rotary movement of the shaft 64 into a rectilineal movement of the yoke 72. The yoke 72 within which the elongated slot 71 is formed carries an outwardly projecting lip 77 which conforms to the perimeter of the elongated slot 71 and provides an opening to receive driving pin 78 carried by the arm 28 of the oscillating member 26. This member was previously described as being mounted upon the horizontal shaft 29.

Figure 4:
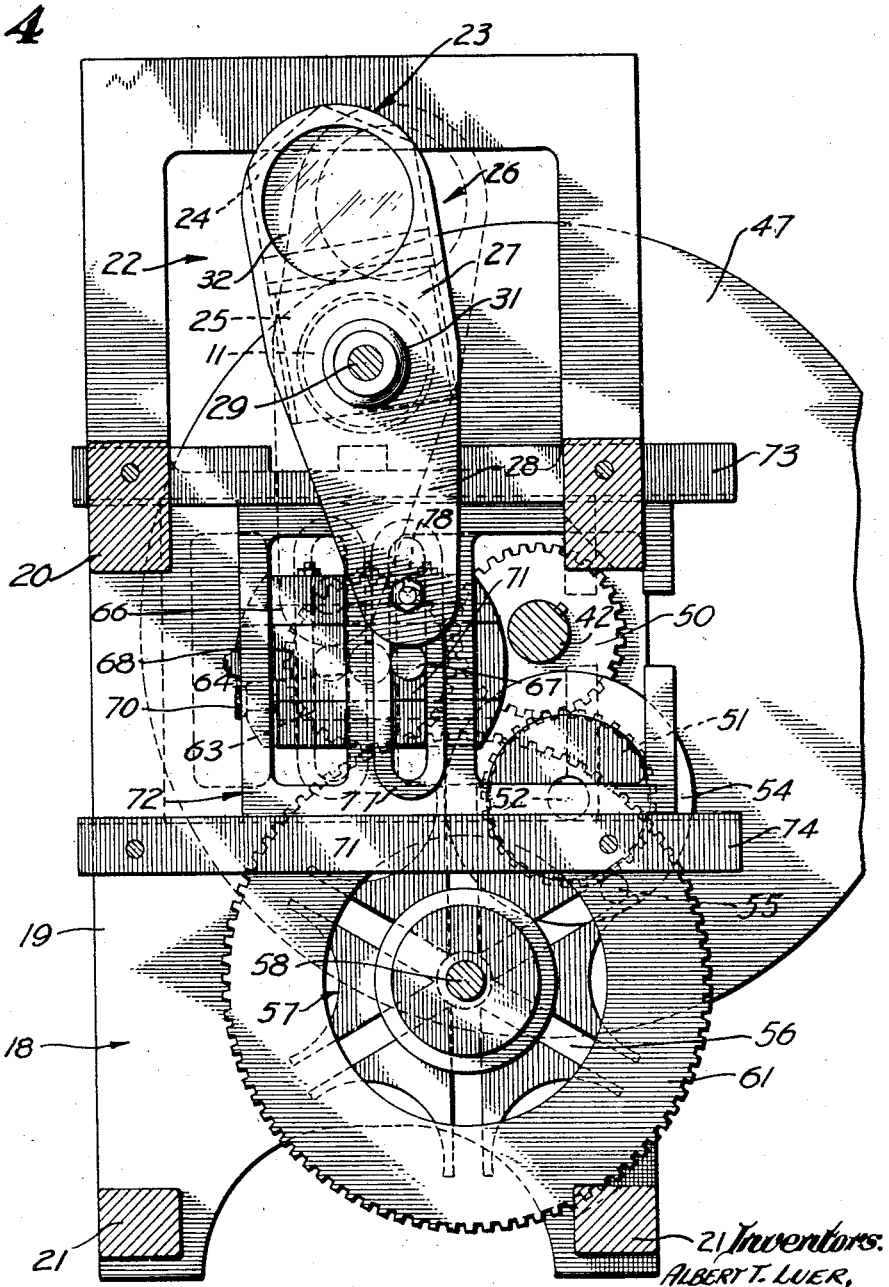
Fig. 4 is a view in vertical section and elevation showing the light directing means as shown on the line 4—4 of Fig. 2.

In operation of the present invention a camera of any common design or construction for the taking of motion pictures is provided. This camera is threaded with a film 40 and there is mounted in advance of the general camera mechanism, including the film feeding mechanism and shutter 47, the light directing unit 17. As previously stated and as shown in Fig. 2 of the drawings, the light directing unit has a shaft 42 which is placed in driving engagement with the shaft 46 of the shutter 47. The light apertures on the shutter are so designed as to insure that while the light directing optical unit 23 is shifting from one position to another the light beam to the lens set 11 will be interrupted. The camera is focused in the usual manner with the light directing unit 23 in the solid line or dotted line position indicated in Fig. 4 of the drawings. Assuming that the light directing unit 23 and the oscillating member 26 are in the position shown in Fig. 3 of the drawings the shutter 47 will be disposed with its light opening 47' in a position to permit the passage of light from the light directing optical unit 23 to the lens set 11 and thence to the film 40. As the shaft 42 rotates in the direction of the arrow a, as indicated in Fig. 3 of the drawings, the gear 50 will rotate in a similar direction and will drive the gear 51 in the direction of the arrow b, as indicated in Fig. 3 of the drawings. This will drive the disc 54 correspondingly and will move the pin 55 into a radial slot 56 of the star wheel 57. The arc of travel of the pin 55 and the circumferential spacing of the radial grooves 56 are such as to insure that for each revolution of the disc 54 the star wheel 57 will rotate one-sixth of a revolution, and the pin 55 will pass out of the groove 56 which it has engaged when that particular groove is in a vertically aligned position and tangent to the circular path of travel of the pin. As the star wheel 57 rotates one-sixth of a revolution the gear 61 will be similarly moved. The ratio between the gear 61 and the gear 63 is such as to insure that as the gear 61 rotates one-sixth of a revolution the gear 63 will rotate one-half of a revolution. The gear 63, as previously described, drives the disc 66 and rotates it around the axis of shaft 64.

Previous to the operation of the machine the transverse plate or cross-head 68 has been adjusted to obtain a suitable spacing of the pin 67 with relation to the axis of shaft 64 and to produce a desired oscillation of the unit 26. As the disc 66 rotates on its axis the pin 67 will pursue a circular path of travel while projecting into the slotted opening 71 of the yoke 72. This will cause the member 72 to reciprocate along the ways 73 and 74, and since the pin 78 carried by the lever 28 is also projecting into this slot the lever unit 28 will oscillate around the axis of the horizontal shaft 29. At the end of a stroke of the yoke 72 in either direction the intermittent motion produced by the Geneva movement including the pin 55 and the star wheel 57 will cause the yoke 72 to stand stationary until the pin 55 has completed its circular course of travel and engages the next succeeding radial groove 56 in the star wheel 57. During this interval of rest at the end of each reciprocating stroke the shutter 47 travels to a position where its light opening 47' will be in a position to permit uninterrupted flow of light from the light directing optical unit 23 to the camera lens unit 11. At such a time an exposure will be made on the film 40. It will be assumed that the first exposure is while the light directing optical unit 23 is standing to the left of the perpendicular passing through the optical axis.

Figure 7:
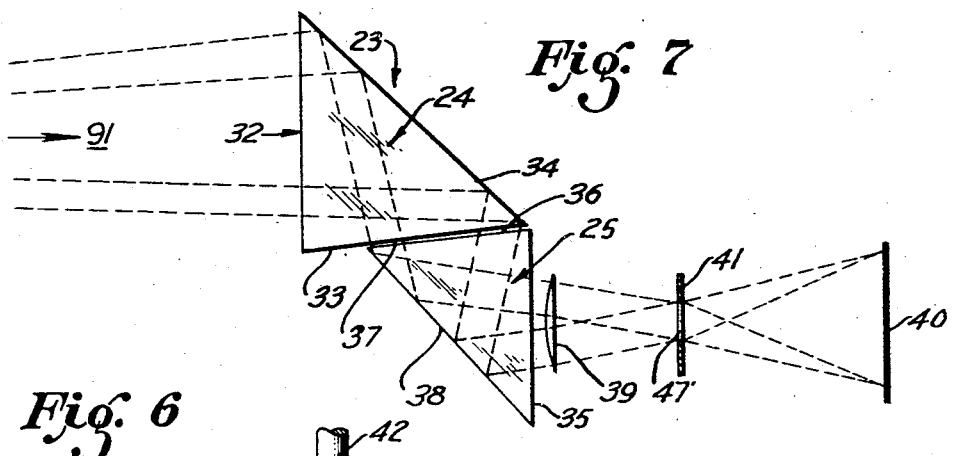
Fig. 7 is a view in diagram indicating the optical arrangement of the light directing means.
Figure 6:
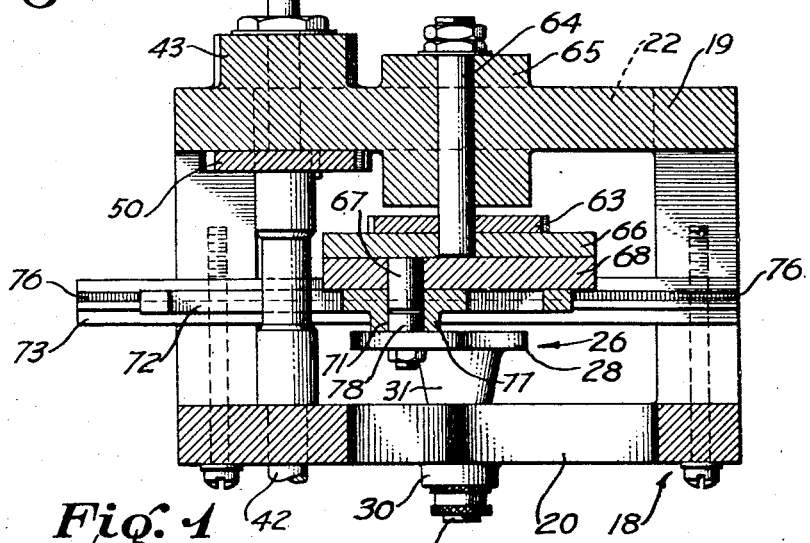
Fig. 6 is a view in horizontal section through the light directing mechanism indicating its operating parts as seen on the line 6—6 of Fig. 5.

A diagram illustrating the action is shown in Fig. 8, where the numeral 90 indicates the photographic subject and 23L indicates the light directing optical unit in its left-hand position while 23R indicates the light directing optical unit in its right-hand position. A light beam 91R travels from the photographic subject 90 to the optical unit 23 when in its right position and a light beam 91L travels from the photographic subject to the optical unit 23 when in its left position. The beam, as illustrated in Fig. 7 of the drawings, passes into the scanning prism 24, from which it is directed into the reflecting prism 25 and strikes the reflecting face 38 thereof. Attention is directed to the fact that while the parallel faces 33 and 36 of the two prisms are disposed at an inclination to the horizontal, light from the prism 24 will not be directed into the prism 25 save by reflection, due to the fact that an air space occurs between the two prisms, the beam 91 after having been bent downwardly and toward the axis of the shaft 29 by the scanning prism 24, is then bent and directed horizontally by the reflecting prism 25 so that it then travels horizontally and along the optical axis of the lens set 11. It will be seen that a film will thus be produced showing right and left views of the photographic subject, as shown in Fig. 9 of the drawings. In the event that it is desired to accentuate the illusion of third dimension the adjusting screw 70 may be manipulated to shift the cross-bar 68 and move the pin 67 farther away from the shaft 64. This will cause a greater throw of the oscillating unit 26 as it swings on the axis of shaft 29.

It will thus be seen that the arrangement here disclosed provides a simple and compact structure which may be used in combination with any ordinary type of motion picture camera and which will act in a simple and effective manner to cause right and left-hand views of a photographic subject to be taken in order to produce a film by which the illusion of depth may be created.

While we have shown the preferred form of our invention as now known to me, it will be understood that various changes may be made in combination, construction and arrangement of parts by those skilled in the art, without departing from the spirit of our invention as claimed.

Having thus described our invention, what we claim, and desire to secure by Letters Patent is:

1. A camera for taking stereoscopic motion pictures, which comprises a film magazine from and into which motion picture film is fed, a feed mechanism for the film, a shutter for interrupting a beam of light to the film, a photographic lens set disposed in advance of the shutter, a light directing optical unit mounted in advance of the lens set and comprising a scanning prism for receiving the beam of light from a photographic scene being photographed and a reflecting prism to which the beam of light is directed by the scanning prism and by which the beam of light is directed to the photographic lens set, means supporting said pair of prisms to oscillate around an extension of the longitudinal center axis of the photographic lens set whereby the scanning lens will be moved to the left and to the right of a central vertical plane intersecting the central axis of the lens set, synchronous driving means for said oscillating member driven by the camera driving means whereby the scanning prism will be shifted to said right and left positions in the interval of non-exposure of the film, and means associated with said operating mechanism for varying and establishing the distance of movement of the scanning prism to the right and left of said central vertical plane.

2. In combination with a camera for taking motion pictures, a frame structure disposed in advance of the camera, a drive shaft carried thereby and disposed in driving relationship to the operating mechanism of the camera whereby said shaft will be continuously driven, an oscillating member supported upon said frame to swing in a vertical plane, the axis of said oscillating member being coincident with the central axis of the lens set of the camera, an optical unit mounted upon said oscillating member at a point above the oscillating axis whereby said unit may move to either side of the central vertical plane occupied by the axis of oscillation, said optical unit including a scanning prism and a reflecting prism assembled with their vertical faces parallel, the vertical face of the scanning prism being presented to the object being photographed and the vertical face of the reflecting prism being presented to the photographic lens set of the camera, said prisms having inclined reflecting faces whereby a beam of light entering the scanning prism may be reflected on to the reflecting face of the reflecting prism and thence parallel to it original path of travel and into the optical lens set, means for alternately oscillating the scanning prism to its right and left-hand positions, and means interposed between the constantly driven shaft and said alternately moving means for intermittently driving the alternately moving means to shift said means from one position to another.

3. In combination with a camera for taking motion pictures, a frame structure disposed in advance of the camera, a drive shaft carried thereby and disposed in driving relationship to the operating mechanism of the camera whereby said shaft will be continuously driven, an oscillating member supported upon said frame to swing in a vertical plane, the axis of said oscillating member being coincident with the central axis of the lens set of the camera, an optical unit mounted upon said oscillating member at a point above the oscillating axis whereby said unit may move to either side of the central vertical plane occupied by the axis of oscillation, said optical unit including a scanning prism and a reflecting prism assembled with their vertical faces parallel, the vertical face of the scanning prism being presented to the object being photographed and the vertical face of the reflecting prism being presented to the photographic lens set of the camera, said prisms having inclined reflecting faces whereby a beam of light entering the scanning prism may be reflected on to the reflecting face of the reflecting prism and thence parallel to its original path of travel and into the optical lens set, means for alternately oscillating the scanning prism to its right and left-hand positions, means interposed between the constantly driven shaft and said alternately moving means for intermittently driving the alternately moving means to shift said means from one position to another, and means for adjustably varying the degree of oscillation of the oscillating member.

4. A camera for taking stereoscopic pictures, which comprises a frame structure, a photographic lens set disposed in operative relation thereto, a film feed mechanism for moving a film to positions with relation to the optical lens set, a rotary shutter intersecting the light beam from the optical set to the film and having a light opening therein, through which light may pass to the film, a light directing optical unit comprising a scanning prism offset from the central axis of the lens set, a reflecting prism disposed in cooperative relation to the scanning prism, whereby a light beam entering the scanning prism may be reflected to the optical lens set, an oscillating frame carrying said prisms, whereby the reflecting prism will be in axial alignment with the lens set at all times, and the scanning prism may swing to right- and left-hand positions, reciprocating means for oscillating said prism frame, intermittent driving means between the reciprocating means and the shutter, whereby the scanning prism may be moved to said right- and left-hand positions in synchronism with the movement of the shutter, and adjustable means for varying the degree of oscillation of the prism frame, whereby the amount of separation between the right- and left-hand positions of the scanning prism may be determined.

5. A camera for taking stereoscopic motion pictures, comprising a frame structure, a prism frame mounted for oscillating movement on said frame structure around a horizontal axis, an optical unit carried by said prism frame including a reflecting prism mounted centrally of said horizontal axis and a cooperating scanning prism mounted eccentrically of said horizontal axis, said prism frame carrying an arm by which its oscillation may be effected, means engaging said arm for oscillating the prism frame, intermittent drive means acting upon said oscillating means to swing the prism frame to its extreme positions, whereby the scanning prism will be disposed at the right and left of the vertical median plane through its oscillating axis, a constantly rotating shaft, gearing between said constantly rotating shaft and the intermittent drive means, a shutter on said shaft, a photographic lens set disposed in axial alignment with the oscillating axis of the prism frame and through which a beam of light may pass to a photographic film as controlled by the shutter, and film feed operating mechanism moving in unison with the shutter.

6. A camera for taking stereoscopic motion pictures, comprising a frame structure, a prism frame mounted for oscillating movement on said frame structure around a horizontal axis, an optical unit carried by said prism frame including a reflecting prism mounted centrally of said horizontal axis and a cooperating scanning prism mounted eccentrically of said horizontal axis, said prism frame carrying an arm by which its oscillation may be effected, means engaging said arm for oscillating the prism frame, intermittent drive means acting upon said oscillating means to swing the prism frame to its extreme positions, whereby the scanning prism will be disposed at the right and left of the vertical median plane through its oscillating axis, a constantly rotating shaft, gearing between said constantly rotating shaft and the intermittent drive means, a shutter on said shaft, a photographic lens set disposed in axial alignment with the oscillating axis of the prism frame and through which a beam of light may pass to a photographic film as controlled by the shutter, film feed operating mechanism moving in unison with the shutter, and adjustable means associated with the prism frame operating means whereby the degree of oscillation of a prism frame may be set.

ALBERT T. LUER.
DONALD M. PERRY.
WARREN HOWELL.
WALDO E. HOWELL.